Figure 1:
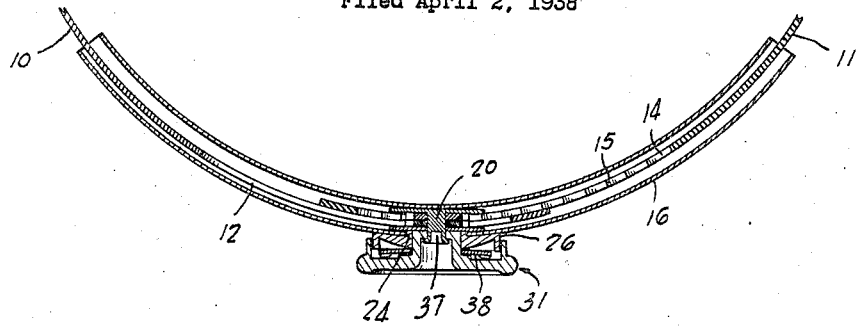

June 25, 1940.  F. M. BOWERS  2,205,742

ADJUSTABLE HEADBAND

Filed April 2, 1938

INVENTOR.
FREDERICK M. BOWERS.
BY Joshua R H Potts
ATTORNEY.

Patented June 25, 1940

2,205,742

UNITED STATES PATENT OFFICE 2,205,742

ADJUSTABLE HEADBAND

Frederick M. Bowers, Chester, Pa.

Application April 2, 1938, Serial No. 199,609

9 Claims. (Cl. 2—8)

This invention has to do with adjustable headbands such as are employed for the purpose of mounting a welding shield or helmet in position on the head of a wearer.

At the present time there is a noticeable trend in this field to supply a headband which is adjustable so that it may fit the head of any particular wearer, and the present invention is concerned primarily with the provision of improved means for effecting the adjustment and maintaining the headband in its adjusted position.

The present invention has in view, as an object, the provision of an adjustable headband in which each extremity of the headband is formed with a slot with one edge o $_{\rho}$ ,·ach slot being provided with a series of teeth to define a rack. These extremities of the headband are intended to assume an overlapping position within a flattened-out tubular casing, and operatively carried by the casing is a gear element in mesh with said racks and provided with appropriate operating means.

A more detailed object of the invention is the provision of improved and novel means for operatively mounting the gear member in the tubular casing, and for maintaining the gear in operative relationship with the racks. In this connection the invention contemplates an arrangement in which a gear assembly is drivably mounted on a shaft which carries at its inner extremity an enlarged disk which serves not only to maintain the gears assembled thereon, but also functions as a spacing element between the inner wall of the tubular casing and one end of the headband. The shaft also carries a washer at the other side, which serves as a spacing element, and to maintain the gear element in proper position on the shaft. The wall of the casing is formed with an opening in which is operatively positioned an operating member that is drivably connected to said shaft.

A detailed object of the invention is the provision of improved means for connecting said operating member to said shaft.

Yet another object of the invention is the provision of improved means for yieldably maintaining said operating member in any adjusted position.

Various features and advantages of the invention which arise in connection with carrying out the above noted ideas in a practical embodiment will in part become apparent and in part be hereinafter stated, as the description of the invention proceeds.

The invention, therefore, comprises an adjustable headband including overlapping ends that are received in a flattened-out tubular casing and formed with slots the edges of which are provided with teeth that define racks. Meshing with the racks is a gear element carried by a shaft which also carries means for maintaining the gear elements and extremities of the band in proper assembled relationship. An operating member is drivably connected to the shaft and provided with improved means for maintaining it in an adjusted position.

Figure 3:
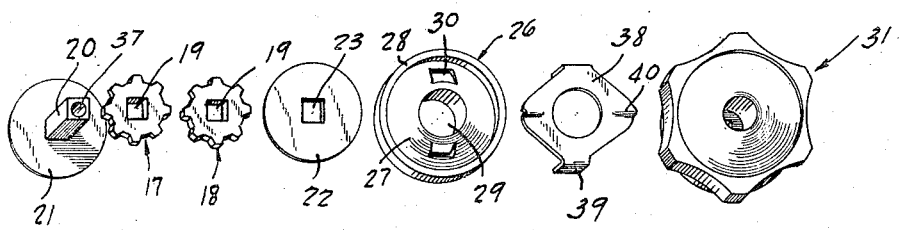
Figures 4, 5, 6, 7:
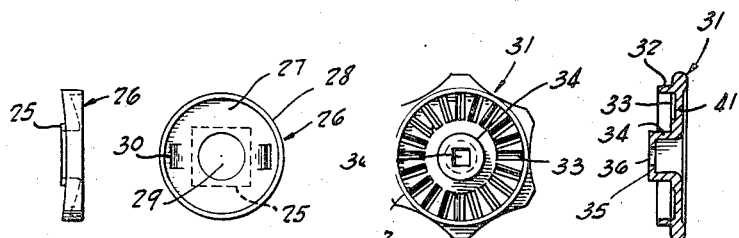
Figure 2:
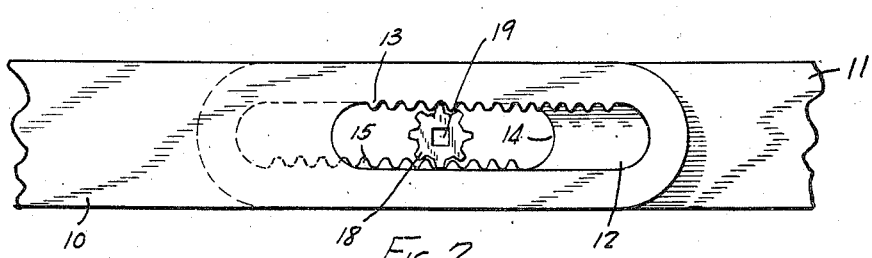

For a full and more complete understanding of the invention reference may be had to the following description and accompanying drawing, wherein Figure 1 is a horizontal view taken as a section through the casing which receives the extremities of an adjustable headband in accordance with the precepts of this invention, Figure 2 is a front elevational view of the overlapping extremities of the headband with the casing removed, Figure 3 is a perspective showing of the several parts of the gear assembly and operating member therefor in exploded relationship, Figure 4 is an enlarged detailed view in end elevation of a member that is associated with the operating member, Figure 5 is a plan view of the member shown in Figure 4, Figure 6 is a bottom plan view of the operating member, and Figure 7 is a section taken through the operating member.

Referring now to the drawing, wherein like reference characters denote corresponding parts, and more particularly to Figures 1 and 2, one extremity of an adjustable headband is designated 10, while the other extremity is identified by the reference character 11. The end portion 10 is shown as formed with a slot 12, the upper edge of which is formed with a series of teeth to define a rack 13. Similarly the end portion 11 is formed with a slot 14, the lower edge of which is provided with a series of teeth to provide a rack 15.

A casing 16 is shown as being of a flattened-out tubular formation, and may be made from any material capable of being formed into the desired shape. The invention has particularly in mind the use of a fibrous material which when in a moistened state may be readily fashioned, but which assumes a rigid construction when dry.

The end portions 10 and 11 are received in the casing 16, and overlap one another, as depicted in Figures 1 and 2. A gear member comprising the two elements 17 and 18 is shown as in mesh with the racks 13 and 15. Obviously the gear member may consist of a single piece of a required thickness, or may be made of the two parts 17 and 18, as illustrated, which may be joined into a unitary piece.

As shown in the drawing, the element 17 is in mesh with the rack 15, while the gear element 18 meshes with the rack 13. Each of these gear elements 17 and 18 is formed with a non-circular opening, such as the squared openings illustrated at 19. Extending through the squared openings 19 is a correspondingly shaped shaft 20 which carries at its inner end an enlarged disk 21 that overlaps the end portion 11 and is interposed between the end portion 11 and the wall of the casing 16.

A washer 22 is also formed with a square opening 23, and fits over the shaft 20. This washer 22 engages the end portion 10, and serves as a spacer between this wall and the outer wall of the casing 16.

The outer wall of the casing 16 is formed with a non-circular opening (preferably a square) designated 24, and extending into this opening is a correspondingly shaped structure 25 carried by a cup element 26. This cup element 26 is formed with a conically shaped recess 27 that is defined by a flange 28, and the central portion of the member 26 which is formed with a circular opening 29. The surfaces of the recess 27 may be formed with a pair of depressions 30 which are diametrically oppositely disposed, as shown in Figure 5.

An operating member designated 31 is shown as being of a formation providing a good grip for the fingers of an operator. This operating member 31 has a depending flange 32 which overlaps the flange 28. The main body portion of the operating member 31 is defined by a web 41, the inner or under surface of which is formed with a plurality of radially extending grooves 33. Extending inwardly from the web 41 is a circular sleeve 34 which finds bearing in the opening 29.

This sleeve 34 terminates in a closed end 35 which is formed with a square opening 36 through which passes the outer extremity of the shaft 20. The end of this shaft 20 is formed with a recess 37, and after being passed through the opening 36, an appropriate tool may be availed of to spread the metal of the shaft 20 to establish a connection similar to a riveted connection, as clearly depicted in Figure 1.

A spring detent is shown at 38 as formed with a pair of fingers 39 which are received in the depressions 30. This detent 38 is of a bowed construction, and at substantially diametrically opposite points is formed with a pair of rounded ridges or protuberances 40 which are designed to cooperate with the grooves 33. It is evident that these protuberances 40 are adapted to be received in any of the grooves 33 to yieldably maintain the operating member in the position in which it might be. These protuberances 40 may take varying forms, but the invention has particularly in mind a rounded ridge that may be readily formed on the member 38 by a die pressing operation.

However, upon sufficient force being supplied to the operating member 31 to rotate the same the protuberance 40 will ride out of the grooves 33, and the operating member 31 thus turned to cause effective rotation of the gear member made up of the elements 17 and 18, to cause relative movement of the end portions 10 and 11.

While the several parts making up the assembly of the gear member and operating means therefor are preferably made from an appropriate metal, it is obvious that this feature, as well as other features of the invention, may be varied and still fall within the purview of the appended claims.

I claim:

1. In combination, a tubular casing of a curved formation corresponding to the shape of a wearer's head and having inner and outer walls, a headband having end portions received in said casing and in overlapping relationship, each of said end portions carrying a rack, a gear means in engagement with each of said racks and operable upon rotation to cause relative movement of the end portions, the said outer wall of said casing being formed with an opening, a bearing member having a portion received in said opening and formed with a bearing opening, an operating member carrying a sleeve extending into the bearing opening of said bearing member and which sleeve is drivably connected to said gear means, and a friction device interposed between said bearing member and said operating member for yieldably maintaining said operating member in an adjusted position.

2. An adjustable headband of the character described comprising, a casing having an outer wall formed with a non-circular opening, a band having ends received in said casing, a bearing member having a portion of a shape corresponding to said non-circular opening and received therein, said bearing member being formed with a bearing opening, an operating member having a sleeve rotatably received in said bearing opening, means operatively connecting said operating member to the said ends, and a friction device interposed between said bearing member and said operating member and constituting a means for yieldably maintaining said operating member in an adjusted position.

3. An adjustable headband of the character described comprising, a casing having an outer wall formed with a non-circular opening, a band having ends received in said casing a bearing member having a portion of a shape corresponding to said non-circular opening and received therein, said bearing member being formed with a bearing opening, an operating member having a sleeve rotatably received in said bearing opening, means operatively connecting said operating member to the said ends the face of said operating member which is disposed towards said bearing member being formed with a plurality of grooves, and a spring detent having protuberances which are adapted to be yieldably received in any of said grooves to maintain the operating member in an adjusted position, said detent being formed with means for holding the same immovable with respect to said bearing member.

4. An adjustable headband of the character described comprising a casing having an outer wall formed with an opening, a band having ends received in said casing, an operating member, means operatively connecting said operating member to said ends, mechanism for maintaining said operating member in an adjusted position, and structure cooperating with said outer wall and said operating member to define a housing enclosing said mechanism.

5. An adjustable headband of the character described comprising a casing having an outer wall formed with an opening, a band having ends received in said casing, a bearing member having a portion received in said opening and having a bearing opening, an operating member having a sleeve rotatably received in said bearing opening, means operatively connecting said operating member to said ends whereby said operating member is operable to move said ends into a desired relation, and automatic means for maintaining said ends in the desired relation.

6. An adjustable headband of the character described comprising a casing having an outer wall formed with an opening, a band having ends received in said casing, a bearing member having a portion received in said opening, said bearing member having a bearing opening communicating with the interior of said casing, an operating member having a sleeve rotatably received in said bearing opening, means operatively connecting said operating member to said ends, mechanism for yieldably maintaining said operating member in an adjusted position, and a housing enclosing said mechanism.

7. An adjustable headband of the character described comprising a flattened-out tubular casing having an outer wall formed with an opening, a band having ends received in said casing, a bearing member having a portion extending into said opening, means for preventing relative rotation between said bearing member and said casing, said bearing member being formed with a bearing opening communicating with the interior of the casing, an operating member having a sleeve rotatably received in said bearing opening, means operatively connecting said operating member to the said ends, a spring detent interposed between the bearing member and operating member for yieldably maintaining said operating member in an adjusted position, and structure carried by said bearing and operating members and cooperating therewith to define a housing for said detent.

8. A headband of the character described comprising a band having ends in overlapping relation, the overlapping portions of said ends being formed with openings, a tubular casing encircling said overlapping ends, said casing having an inner wall adapted to engage the head of a wearer and an outer wall formed with an opening, a bearing member in said last-mentioned opening, means for preventing rotation of said bearing member with respect to said casing, said bearing member having a bearing opening, an abutment member between said inner wall and said overlapping ends, an operating member disposed exteriorly of said bearing member, shaft means connecting said operating and abutment members and extending through said openings in said overlapping ends and said bearing opening, operating connections between said shaft means and said overlapping ends, and means interposed between said bearing and operating members for maintaining said operating member in an adjusted position.

9. An adjustable headband of the character described comprising a tubular casing having an outer wall formed with an opening, a band having ends received in said casing, a member nonrotatably carried by said casing, an operating member, means operatively connecting said operating member to said ends, means interposed between said members for yieldably maintaining said operating member in an adjusted position, and structure carried by said members and cooperating therewith to define a housing for said last mentioned means.

FREDERICK M. BOWERS.